US009805354B2

(12) United States Patent
Dimokas

(10) Patent No.: US 9,805,354 B2
(45) Date of Patent: Oct. 31, 2017

(54) METHODS AND DEVICES FOR GENERATING AND REPORTING DIGITAL QR RECEIPTS

(71) Applicant: George Dimokas, Virginia Beach, VA (US)

(72) Inventor: George Dimokas, Virginia Beach, VA (US)

(*) Notice: Subject to any disclaimer, the term of this patent is extended or adjusted under 35 U.S.C. 154(b) by 21 days.

(21) Appl. No.: 14/142,243

(22) Filed: Dec. 27, 2013

(65) Prior Publication Data

US 2014/0188645 A1 Jul. 3, 2014

Related U.S. Application Data

(60) Provisional application No. 61/746,166, filed on Dec. 27, 2012.

(51) Int. Cl.
| | | |
|---|---|---|
| *G06G 1/12* | (2006.01) | |
| *G06Q 20/00* | (2012.01) | |
| *G06Q 20/20* | (2012.01) | |
| *G06Q 10/06* | (2012.01) | |
| *G06Q 20/32* | (2012.01) | |

(Continued)

(52) U.S. Cl.
CPC ......... *G06Q 20/202* (2013.01); *G06Q 20/209* (2013.01); *G06Q 20/3221* (2013.01); *G06Q 10/0637* (2013.01); *G06Q 20/327* (2013.01); *G06Q 30/0201* (2013.01); *G07F 17/32* (2013.01); *G07F 17/3211* (2013.01)

(58) Field of Classification Search
CPC ............... G06Q 40/00; G06Q 30/0201; G06Q 10/0637; G06Q 20/327; G06Q 30/00–30/06; G06Q 20/20; G06Q 20/209; G07F 17/32; G07F 17/3211; G06F 3/00; G06F 8/38
USPC .......... 705/14.23, 21, 75, 16, 4, 7.23, 14.27, 705/14.53, 14.65, 14.54, 14.25, 14.61, 24, 705/26.8, 14.33, 14.38; 707/769; 235/375, 380–385, 494; 463/31; 715/716
See application file for complete search history.

(56) References Cited

U.S. PATENT DOCUMENTS

| | | | | |
|---|---|---|---|---|
| 5,789,732 A | * | 8/1998 | McMahon | ....... G06K 19/07703 235/380 |
| 6,067,529 A | * | 5/2000 | Ray | ..................... G06Q 20/0453 380/270 |

(Continued)

OTHER PUBLICATIONS

International Search Report and the Written Opinion of the International Searching Authority dated Apr. 24, 2014, in International Application No. PCT/US13/78045,14 pages.

(Continued)

*Primary Examiner* — Olusegun Goyea
(74) *Attorney, Agent, or Firm* — Rothwell, Figg, Ernst & Manbeck, P.C.

(57) ABSTRACT

A system for managing transaction information includes a user device, a transaction server having a processor and a memory, and a point-of-sale device. The point-of-sale device is configured to communicate identification information and transaction information associated with a user purchase to said user device. The point-of-sale device is further configured to transmit said identification information and transaction information over a network to said transaction server.

22 Claims, 14 Drawing Sheets

(51) Int. Cl.
  *G07F 17/32*   (2006.01)
  *G06Q 30/02*   (2012.01)

(56) References Cited

U.S. PATENT DOCUMENTS

| | | | |
|---|---|---|---|
| 6,341,353 B1* | 1/2002 | Herman | A63F 13/12 |
| | | | 705/39 |
| 6,533,168 B1* | 3/2003 | Ching | G06K 7/10722 |
| | | | 235/375 |
| 6,543,683 B2* | 4/2003 | Hoffman | G06Q 20/0453 |
| | | | 235/375 |
| 6,736,322 B2* | 5/2004 | Gobburu | G06Q 20/04 |
| | | | 235/462.01 |
| 6,920,431 B2* | 7/2005 | Showghi | G06Q 10/02 |
| | | | 705/15 |
| 7,328,002 B2* | 2/2008 | Goto | G06Q 20/04 |
| | | | 379/265.02 |
| 7,431,202 B1* | 10/2008 | Meador | G06Q 20/32 |
| | | | 235/379 |
| 7,827,077 B2 | 11/2010 | Shiftan et al. | |
| 8,909,620 B2* | 12/2014 | Argue | G06F 17/30 |
| | | | 707/722 |
| 2002/0023215 A1* | 2/2002 | Wang | G06Q 20/00 |
| | | | 713/171 |
| 2002/0060246 A1* | 5/2002 | Gobburu | G06Q 20/04 |
| | | | 235/462.46 |
| 2002/0147645 A1* | 10/2002 | Alao | G06Q 30/0209 |
| | | | 705/14.54 |
| 2003/0033272 A1* | 2/2003 | Himmel | G06Q 10/02 |
| 2003/0055733 A1* | 3/2003 | Marshall | G06Q 20/0453 |
| | | | 705/24 |
| 2003/0158819 A1* | 8/2003 | Scott | G06F 21/10 |
| | | | 705/65 |
| 2007/0069013 A1* | 3/2007 | Seifert | G06Q 20/0453 |
| | | | 235/383 |
| 2007/0287413 A1* | 12/2007 | Kleitsch | H04L 12/14 |
| | | | 455/405 |
| 2008/0065487 A1* | 3/2008 | Shea | G06Q 30/02 |
| | | | 705/14.61 |
| 2008/0313066 A1* | 12/2008 | Sholtis | G06Q 30/06 |
| | | | 705/35 |
| 2009/0006151 A1* | 1/2009 | Zarghami | G06Q 10/06375 |
| | | | 705/7.31 |
| 2009/0157512 A1* | 6/2009 | King | G06Q 10/10 |
| | | | 705/14.27 |
| 2010/0177343 A1* | 7/2010 | Shapiro | G06Q 10/0637 |
| | | | 358/1.15 |
| 2010/0320266 A1 | 12/2010 | White | |
| 2011/0099073 A1* | 4/2011 | Yigit | G06F 17/30528 |
| | | | 705/14.66 |
| 2011/0208561 A1* | 8/2011 | Randall | G06Q 30/02 |
| | | | 705/7.32 |
| 2011/0246284 A1 | 10/2011 | Chaikin et al. | |
| 2011/0307318 A1* | 12/2011 | LaPorte | G06Q 20/209 |
| | | | 705/14.33 |
| 2012/0084391 A1* | 4/2012 | Patel | G06Q 20/0453 |
| | | | 709/217 |
| 2012/0166298 A1* | 6/2012 | Smith | G06Q 20/209 |
| | | | 705/24 |
| 2012/0179966 A1* | 7/2012 | Kappos | G06F 8/38 |
| | | | 715/716 |
| 2012/0191522 A1* | 7/2012 | McLaughlin | G06Q 50/01 |
| | | | 705/14.23 |
| 2012/0191566 A1 | 7/2012 | Sayan | |
| 2012/0203697 A1 | 8/2012 | Morgan et al. | |
| 2012/0209630 A1* | 8/2012 | Ihm | G06Q 20/3274 |
| | | | 705/4 |
| 2012/0253852 A1 | 10/2012 | Pourfallah et al. | |
| 2012/0271725 A1* | 10/2012 | Cheng | H04W 4/008 |
| | | | 705/21 |
| 2012/0280040 A1* | 11/2012 | Carney | G06Q 20/0453 |
| | | | 235/383 |
| 2012/0284081 A1* | 11/2012 | Cheng | G06Q 30/02 |
| | | | 705/7.29 |
| 2012/0284130 A1* | 11/2012 | Lewis | G06Q 40/00 |
| | | | 705/16 |
| 2012/0290609 A1* | 11/2012 | Britt | G06Q 30/06 |
| | | | 707/769 |
| 2012/0316950 A1* | 12/2012 | LaPorte | G06Q 20/3276 |
| | | | 705/14.33 |
| 2012/0316959 A1* | 12/2012 | Hymel | G06Q 50/01 |
| | | | 705/14.53 |
| 2012/0324242 A1* | 12/2012 | Kirsch | G06Q 20/0855 |
| | | | 713/189 |
| 2013/0073365 A1* | 3/2013 | McCarthy | G06Q 20/02 |
| | | | 705/14.23 |
| 2013/0110728 A1* | 5/2013 | Kobres | G06Q 30/06 |
| | | | 705/75 |
| 2013/0124346 A1* | 5/2013 | Baldwin | G06Q 20/322 |
| | | | 705/16 |
| 2013/0144731 A1* | 6/2013 | Baldwin | G06Q 20/20 |
| | | | 705/17 |
| 2013/0151344 A1* | 6/2013 | Tavares | G06Q 30/0201 |
| | | | 705/14.65 |
| 2013/0159080 A1* | 6/2013 | Wu | G06Q 30/02 |
| | | | 705/14.23 |
| 2013/0238455 A1* | 9/2013 | Laracey | G06Q 20/108 |
| | | | 705/21 |
| 2013/0246147 A1* | 9/2013 | Chen | G06Q 30/0226 |
| | | | 705/14.25 |
| 2013/0256403 A1* | 10/2013 | MacKinnon Keith | G06K 5/00 |
| | | | 235/375 |
| 2013/0262179 A1* | 10/2013 | Harada | G06Q 30/0201 |
| | | | 705/7.29 |
| 2013/0305035 A1* | 11/2013 | Lyne | H04W 4/008 |
| | | | 713/150 |
| 2013/0337913 A1* | 12/2013 | Tardif | G07F 17/3211 |
| | | | 463/31 |
| 2013/0346176 A1* | 12/2013 | Alolabi | G06Q 30/0222 |
| | | | 705/14.23 |

OTHER PUBLICATIONS

European Search Report of the European Patent Office dated Jul. 7, 2016, in European Application No. 13867171.4, 7 pages.

* cited by examiner

| id | uid | details |
|---|---|---|
| 211 | fd2695fb-728c-44da-b363-f07c07811b3e | 20130523400000000411~040293153665~White LED 180Mcd~3.99|1~040293388548~Seeed Studio Ethernet Shield~19.99|^Sales Tax~1.08 |
| 231 | 3a46c3e4-4650-473e-b2f8-63711b6bbffd | 20130529000000000411~040293102395~Copper Clad Printer Circuit Board~9.99|^Sales Tax~0.45 |
| 241 | 7e546287-568a-4ba8-9373-6cfd69dcd18b | 20130529000000000411~040293388548~Seeed Studio Ethernet Shield~19.99|1~040293102395~Copper Clad Printer Circuit Board~9.99|1~040293153665~White LED... |

METHODS AND DEVICES FOR GENERATING AND REPORTING DIGITAL QR RECEIPTS

CROSS REFERENCE TO RELATED APPLICATIONS

The present application claims priority under 35 U.S.C. §119(e) to Provisional Application No. 61/746,166 titled "Digital QR Receipts and Reporting Software Accounting Applications," filed on Dec. 27, 2012, the entire contents of which are incorporated herein by reference.

TECHNICAL FIELD

This disclosure relates generally to digital QR receipts and, more particularly, to methods and devices for generating and reporting digital QR receipts.

BACKGROUND

The use of electronic devices for conducting transactions is commonplace in today's consumer market. Each transaction requires storage of information to be able to account for the transaction. Additionally, transactions are commonly associated with a paper receipt provided to a consumer as a record of the transaction. Based on the number of transactions that may occur for an individual user or business, accounting of each transaction can be time consuming and difficult to maintain.

SUMMARY

According to some embodiments, a system for managing transaction information includes a user device, a transaction server having a processor and a memory, and a point-of-sale device. The point-of-sale device is configured to communicate identification information and transaction information associated with a user purchase to said user device. The point-of-sale device is also configured to transmit said identification information and transaction information over a network to said transaction server.

In some embodiments, a method for providing transaction information to a user device includes obtaining, at a point-of-sale device, identification information and transaction information. The method further includes generating, at the point-of-sale device, a Quick Response (QR) code based on said identification information and transaction information. The method further includes displaying, at the point-of-sale device, said QR code. The method also includes transmitting, from said point-of-sale device to a remote transaction server, said identification information and transaction information.

According to some embodiments, a method for obtaining transaction records includes receiving, at a user device from a point-of-sale device, identification information and transaction information corresponding to a user purchase. The method further includes receiving, at the user device, user input identifying a transaction record relating to said user purchase. The method further includes transmitting, from the user device to a transaction server, a request for said transaction record. The method further includes receiving, from the transaction server, said transaction record. The method also includes displaying, on a screen of the user device, information related to said transaction record.

In some embodiments, a method for managing transaction records includes receiving, at a transaction server from a point-of-sale device, identification information and transaction information associated with a user purchase. The method further includes storing, in a database, said identification information and transaction information. The method further includes receiving, from a user device, a request of a transaction record associated with said user purchase. The method further includes generating, at the transaction server, a transaction record associated with said user purchase. The method also includes transmitting, from said transaction server to the user device, said transaction record.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 5 illustrates an exemplary format of contents stored in a database.

DETAILED DESCRIPTION

Figure 1:
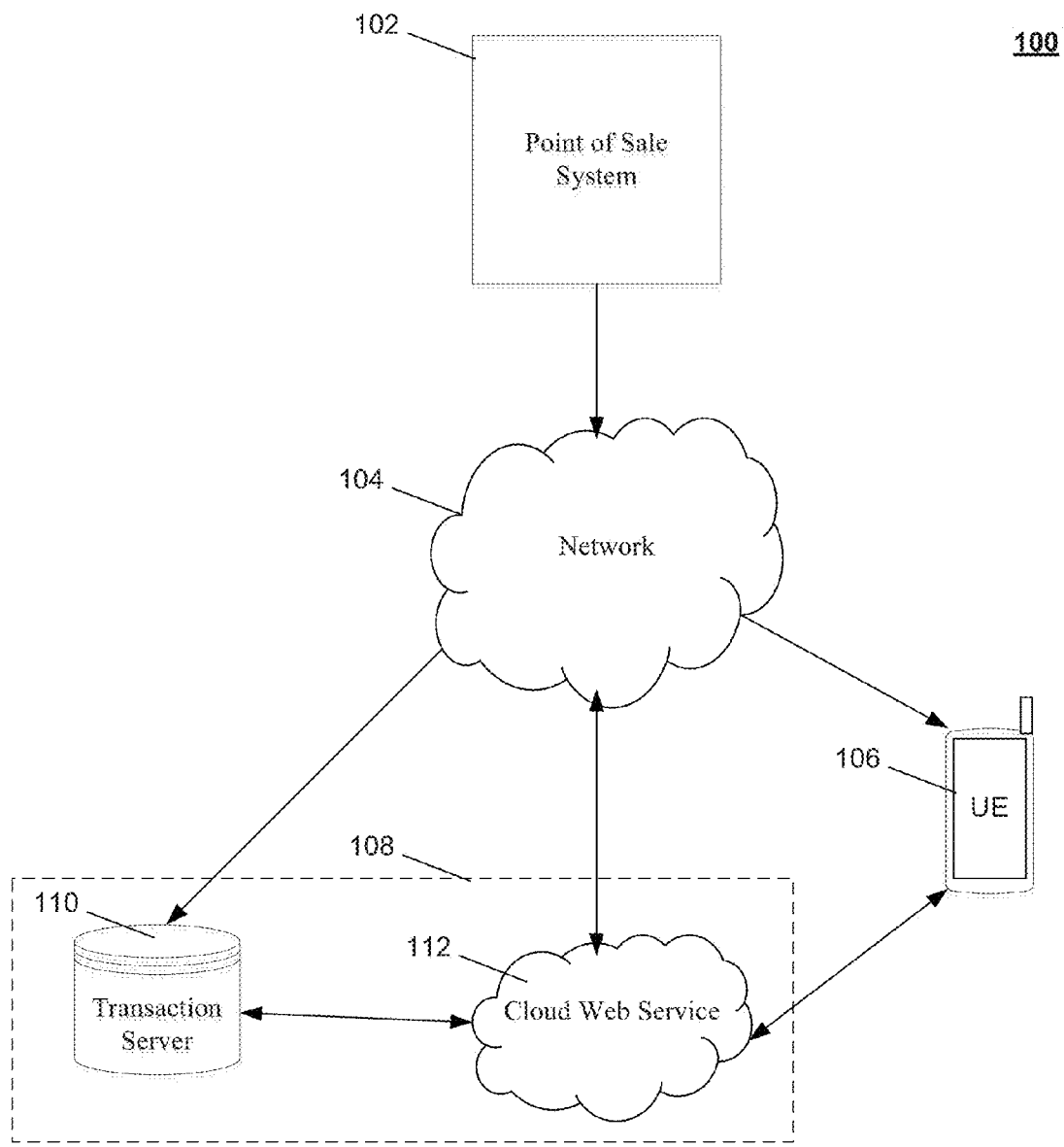
FIG. 1 illustrates an exemplary communication network system.

Embodiments of the present invention are directed to a "Personal and Business Quick Response Accounting Application" (PBQR Accounting Application) that provides personal and/or business accounting for all monetary transactions. This accounting application eliminates the need for "paper" receipts and allows transactions to be stored in any one of a smart phone, personal computer, tablet, or the "cloud." Transactions may then be displayed on a spreadsheet or uploaded to various personal or business accounting systems. The accounting application allows for immediate transaction recognition and a digital record to ensure security of a user's accounts while reducing the requirement for manual tracking of the user's personal or business expenses.

According to some embodiments, the accounting application is applicable to a wide variety retail stores, such as a grocery store, and also to other service industries such as gas stations and restaurants. For example, in a grocery store, a user completes the shopping experience by paying for goods and receiving an electronic receipt. The point of sale monitor of the grocery store displays a specific QR code that the user scans using a mobile device such as a smartphone. The user may open the accounting application on the user's smart phone and use the accounting application to scan the specific QR code. By scanning the specific QR code, the user is able to view the receipt on the smart phone, download a file containing the receipt, or print the file containing the receipt. Additionally the file can be transferred via the internet or cloud hosting service to other devices.

In some embodiments, whenever the user tries to access this receipt, the user sees a paid advertisement before having access to the document. Each product line item in the receipt may contain a hyperlink to an advertisement of the product. Furthermore, when travelling, all of the user's receipts may be entered into the user's mobile device via scanning a QR code, which allows the user to store all receipts on a cloud service, and prevents the loss of important documentation. Furthermore, the receipts can be uploaded to any accounting software or credit card programs known to one of ordinary skill in the art to enable reconciliation. The accounting application further facilitates separating personal and business expenses and reporting.

According to some embodiments, the accounting application is a mobile application that can be downloaded to a user's mobile device (e.g., smartphone, tablet, etc.). As an example, the user may use the mobile device to access an Application store where the accounting application may be downloaded for free or for a price. When the accounting application is purchased, the accounting application may be devoid of advertisements and/or provide one or more services not available in the free version of the accounting. In addition to mobile application, the accounting application may be downloaded to a user's personal computer or any other computing device that is configured to access the internet.

In some embodiments, the QR code software may be an installed part of a retailer's point of sale system, integrated into the retailer's hardware or software as proscribed by the retailer's point of sale system vendor. For example, Quickbooks may add a module to support QR code generation, or the vendor of a card swipe/pin pad may integrate the QR code generation in the device's firmware. The accounting application may provide the software development kit (SDK) and standards for how to create and send the data to the cloud, which the vendor uses to implement in point of sale systems and devices.

FIG. 1 illustrates an embodiment of a communication network system 100 that deploys the accounting application. In some embodiments, the communication network system includes a point of sale system 102 that is connected to a network 104. A UE 106 and a host site 108 are also connected to network 104. The host site includes a transaction server 110 and a cloud web service 112 that each may be individually connected to the network 104. The UE 106 may further connected to the Cloud web service 112.

The UE 106 may be any mobile device such as a smartphone (i.e., iPhone, Samsung Galaxy, etc.) or a tablet computing device (i.e, iPad, Samsung Notebook, etc.). The point of sale system 102 may be any electronic computing device used by a retailer that includes a scanner to scan products for purchase and a card reader to swipe credit cards. The network 104 may be a wireless network operating the Internet protocol. The host site 108 may be any third party vendor that provides cloud web services such as data storage and file downloads.

Figure 2:
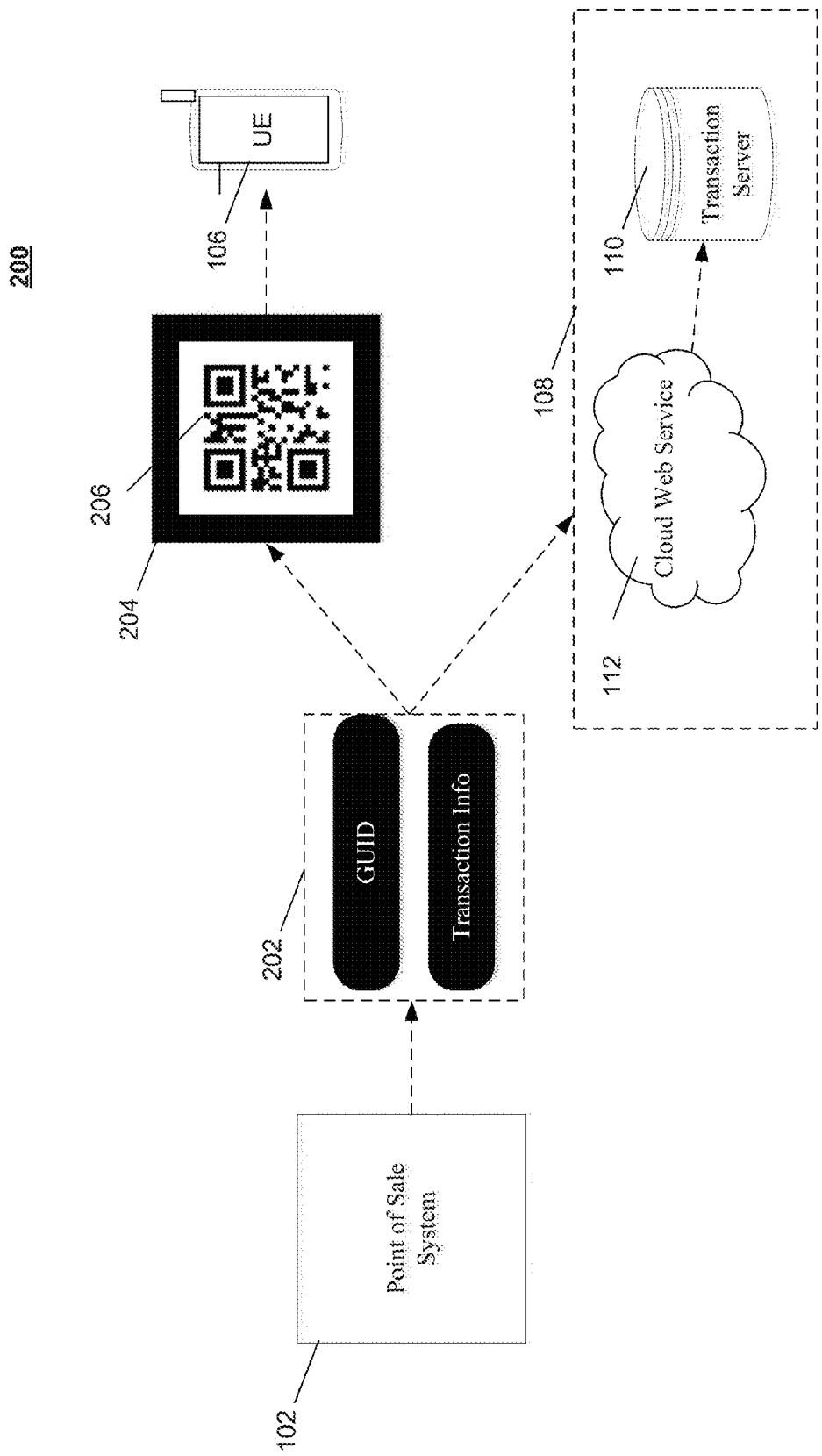
FIG. 2 illustrates an embodiment of providing transaction information from a point of sales device to a mobile device

FIG. 2 illustrates an embodiment of providing transaction information from a point of sales device to a mobile device. A user of UE 106 may purchase a product using point of sales system 102. According to some embodiments, the point of sales system 102 generates a Globally Universal ID (GUID) and loads the GUID and transaction information 202 into the Cloud web service 112 via a web service call. The GUID and transaction details are stored in a database such as transaction server 110. The GUID is an identifier that is global to at least a point of sales system, transaction server, and a user's device. The GUID is advantageous because the possibility that the same ID could be generated by two separate machines is highly improbable. At the same time, one system does not need to coordinate with another system (e.g., "phone home") to coordinate the GUID generation. That is, for example, the point of sale system can generate the GUID whether or not there is an internet connection.

In some embodiments, the GUID and transaction information are used to generate a Quick Response (QR) code 204, which is displayed on a screen of the point of sales system 102, or any other display device (i.e., external card reader with LCD screen) that is connected via cable or wirelessly to the point of sales system 102. The QR code may include a predetermined grouping of symbols. The user of the UE 106 may use a capture device of UE 106 to scan their QR code displayed on the screen of the point of sale system 102. The capture device may be a camera included on the UE 106. Furthermore, the accounting application may be used to control the camera to capture an image of the QR code, where the accounting application subsequently translates the QR code. As understood by one of ordinary skill in the art, the accounting application is not limited to computers, smartphones, or tablets and may be included in any device that can download the accounting application and has a camera such as Google Glass and Samsung Smartwatch.

Figure 3:
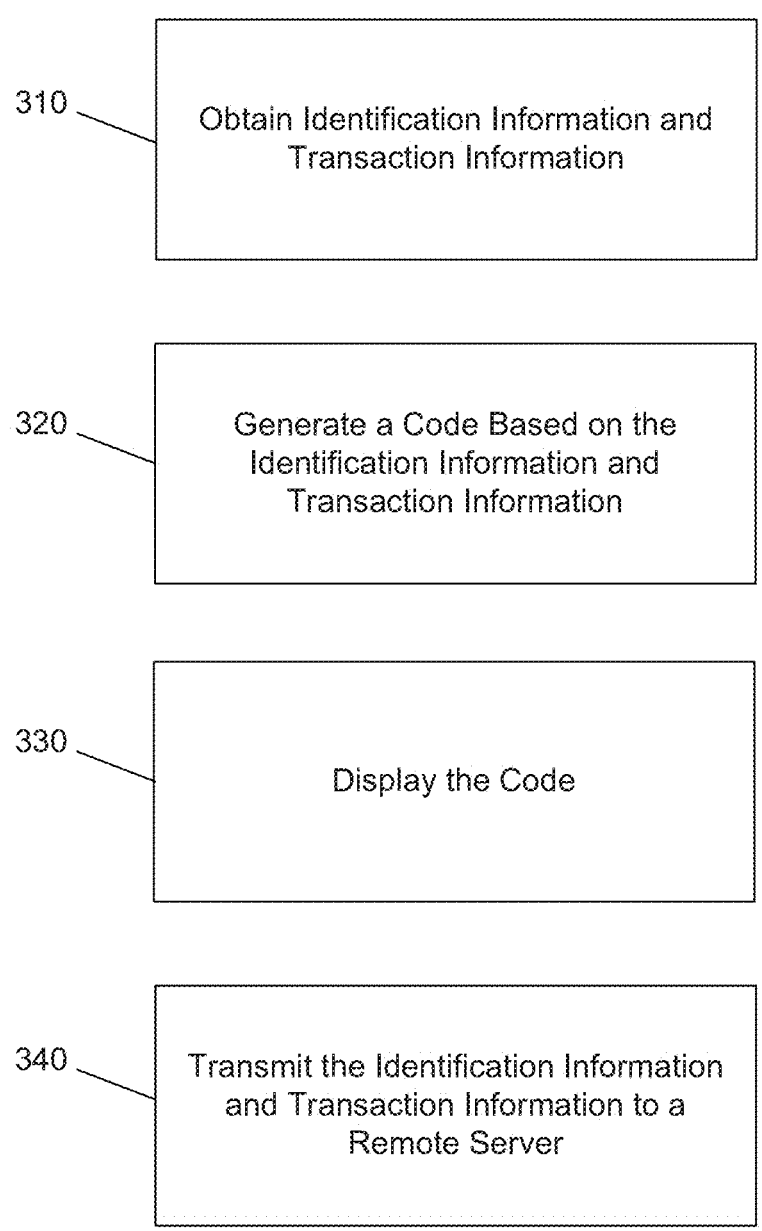
FIG. 3 illustrates an exemplary process performed at a point of sale device.

FIG. 3 illustrates an example process performed by point of sale system 102. In some embodiments, the process generally starts at 310 when the point of sale system 102 obtains identification information and transaction information. As an example, when a product is purchased, the point of sale system 102 may scan a barcode on the product where identification information (i.e., GUID) and transaction information are correlated with the scanned barcode.

The process proceeds 320 to generate a code based on identification information and transaction information. As an example, code 204 is generated and associated with transaction information and GUID 202. In step 330, the code is displayed such as on a screen of the point of sale system 102. In step 340, the identification information and transaction information are transmitted to a remote server, such as transaction server 110, for storage.

Figure 4:
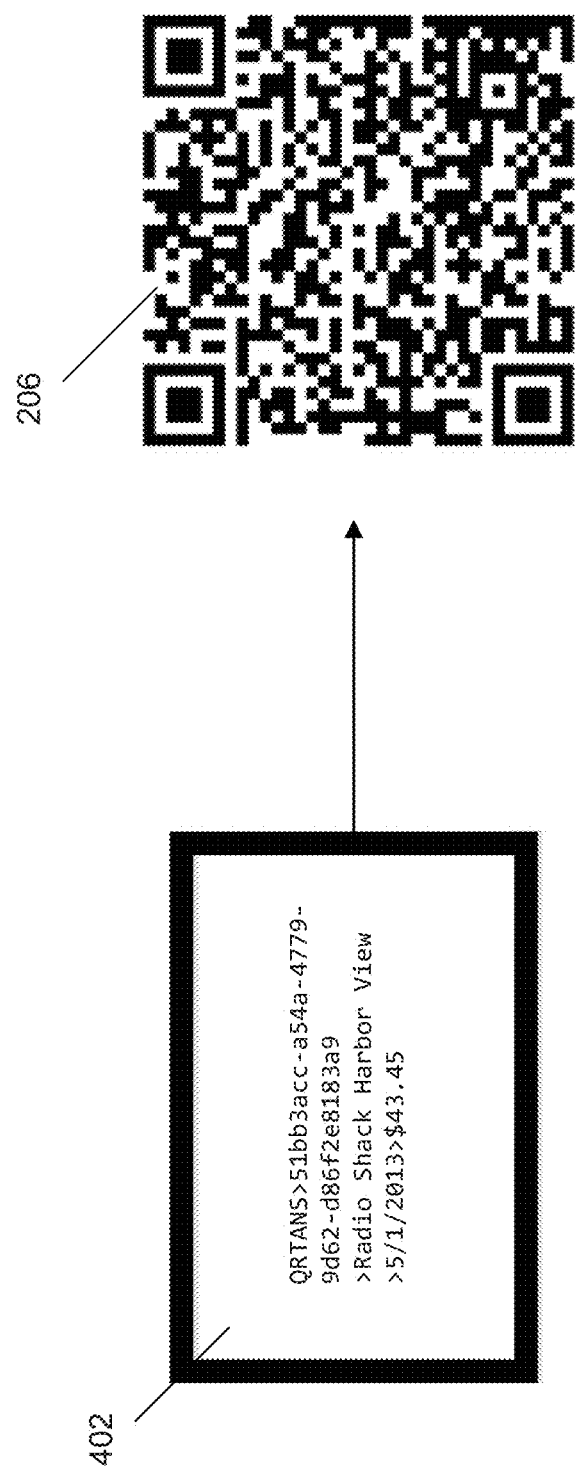
FIG. 4 illustrates an exemplary text string and corresponding Quick Response (QR) code.

FIG. 4 illustrates an embodiment of information represented by a QR code. Box 402 illustrates information that may be included in the transactions information associated with a purchase of a product with each field appended into a text string separated by a ">" character. As an example, the transaction information may include a text that identifies the code as a QR transaction (i.e., QTRANS), the GUID (i.e., 51bb3acc-a54a-4779-9d62-d86f2e8183a9), the name of the merchant or retailer (i.e., Radio Shack Harbor View), the date of the transaction, (i.e., 5/1/2013), and the transaction amount (i.e., $43.45). The transactions information may also include identifier associated with products or services purchased. The QR code 206 is an example of the QR code that is generated by the text string contained in box 402.

According to some embodiments, the point of sale system 102 includes a library that generates the QR code image. As an example, the text string illustrated in box 402 is fed into the library that generates the QR code image. Examples of QR code libraries include, but are not limited to QrCode.net, ZXing, PHP QR code, or any other QR code library known to one of ordinary skill in the art. Additionally, the accounting application downloaded to a user's computer or mobile device includes a QR code library for translating a QR code into a text string.

FIG. 5 illustrates an embodiment of a format for storing transaction information in a database. As an example, the format may include a numeric transaction ID 502, the GUID 504 generated by the point of sale system, and a delineated text string 506 encoding the details of the transactions. This data may be extracted by advertisers and market researchers to determine what products were sold at a particular location. In some embodiments, the format does not include personal identifiable information stored in the database to insure a customer's privacy.

Figure 6:
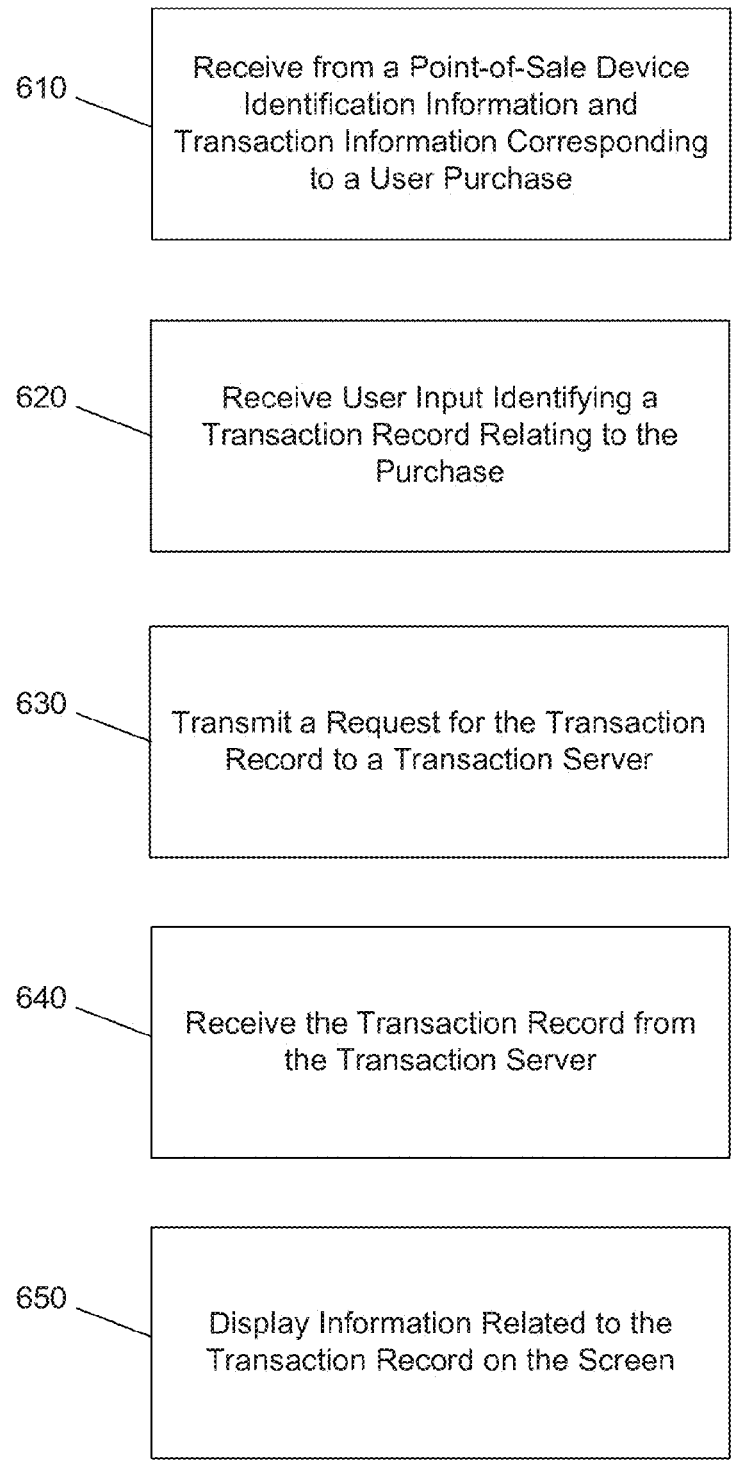
FIG. 6 illustrates an exemplary process performed on a mobile device.
Figure 7:
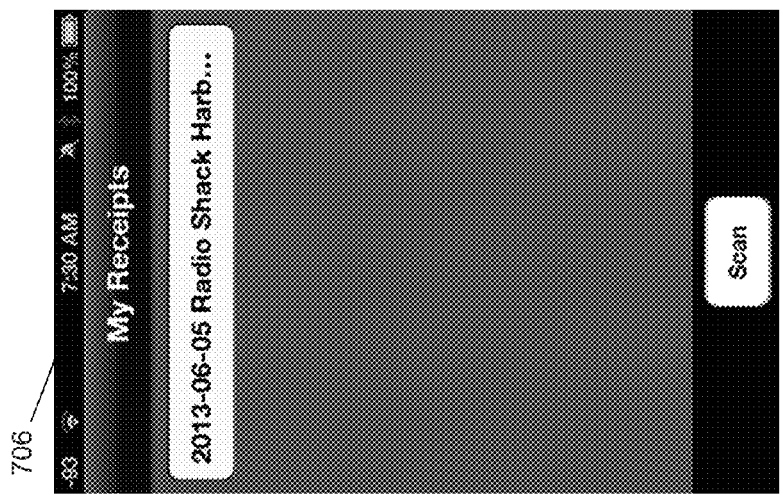
FIGS. 7 through 10 illustrate exemplary screenshots of an accounting application.
Figure 7:
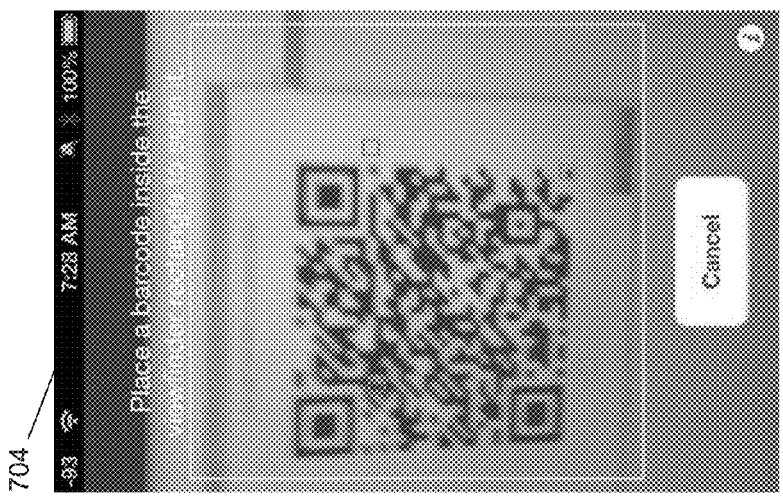
Figure 7:
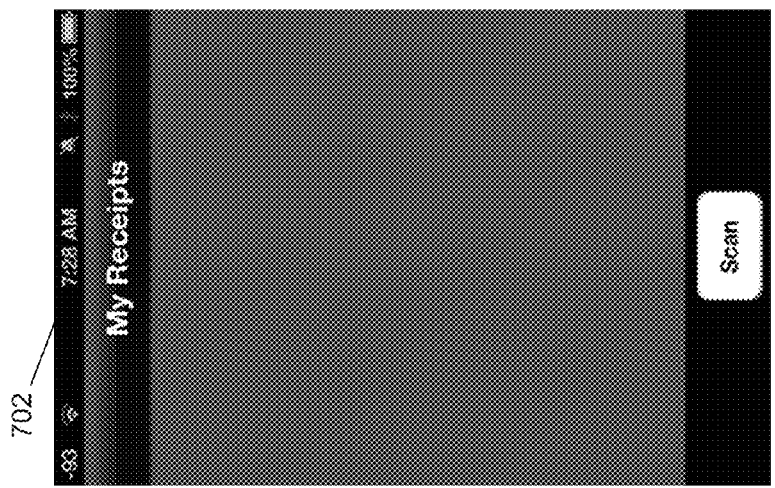
Figure 8:
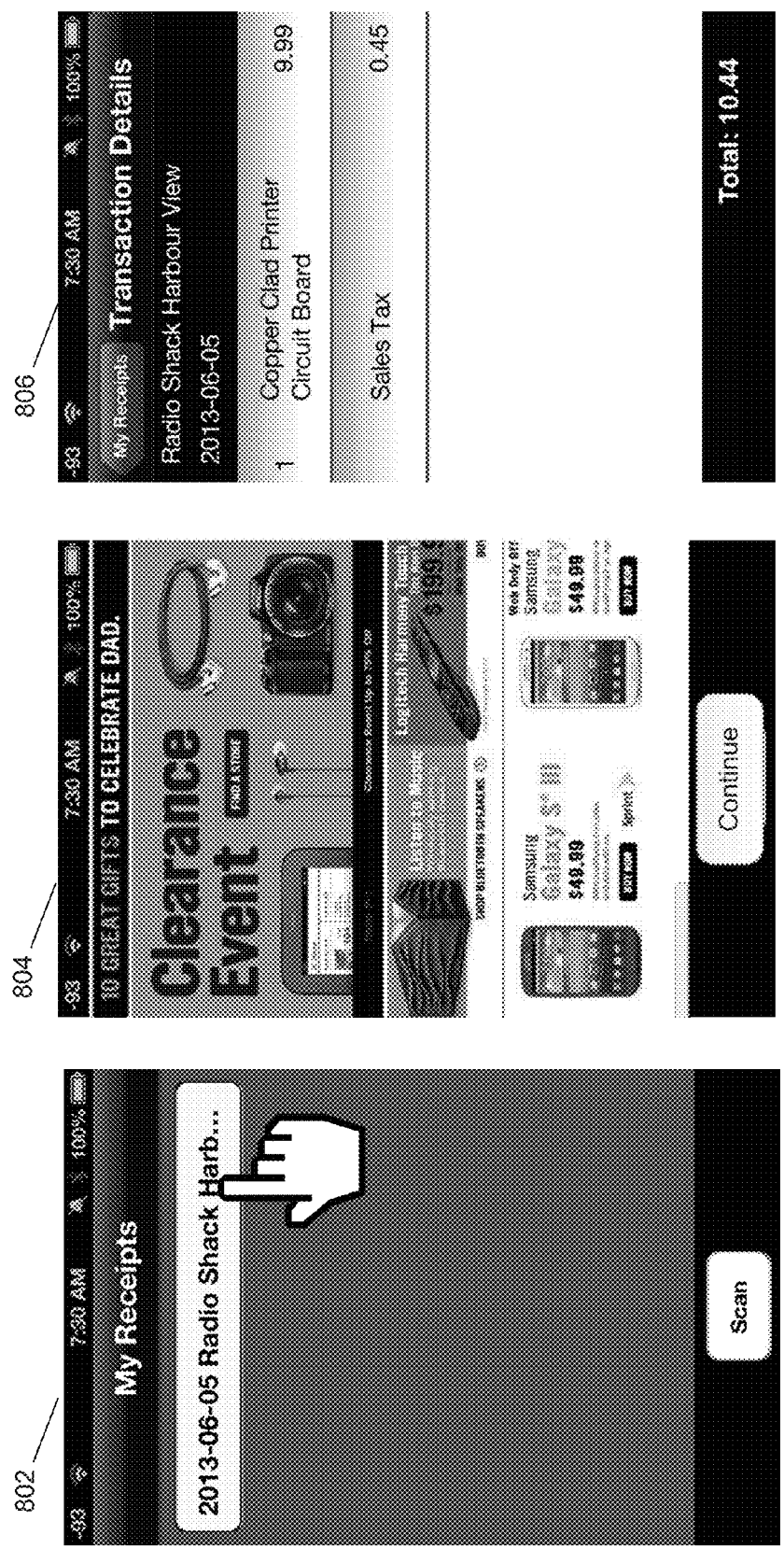
Figure 9:
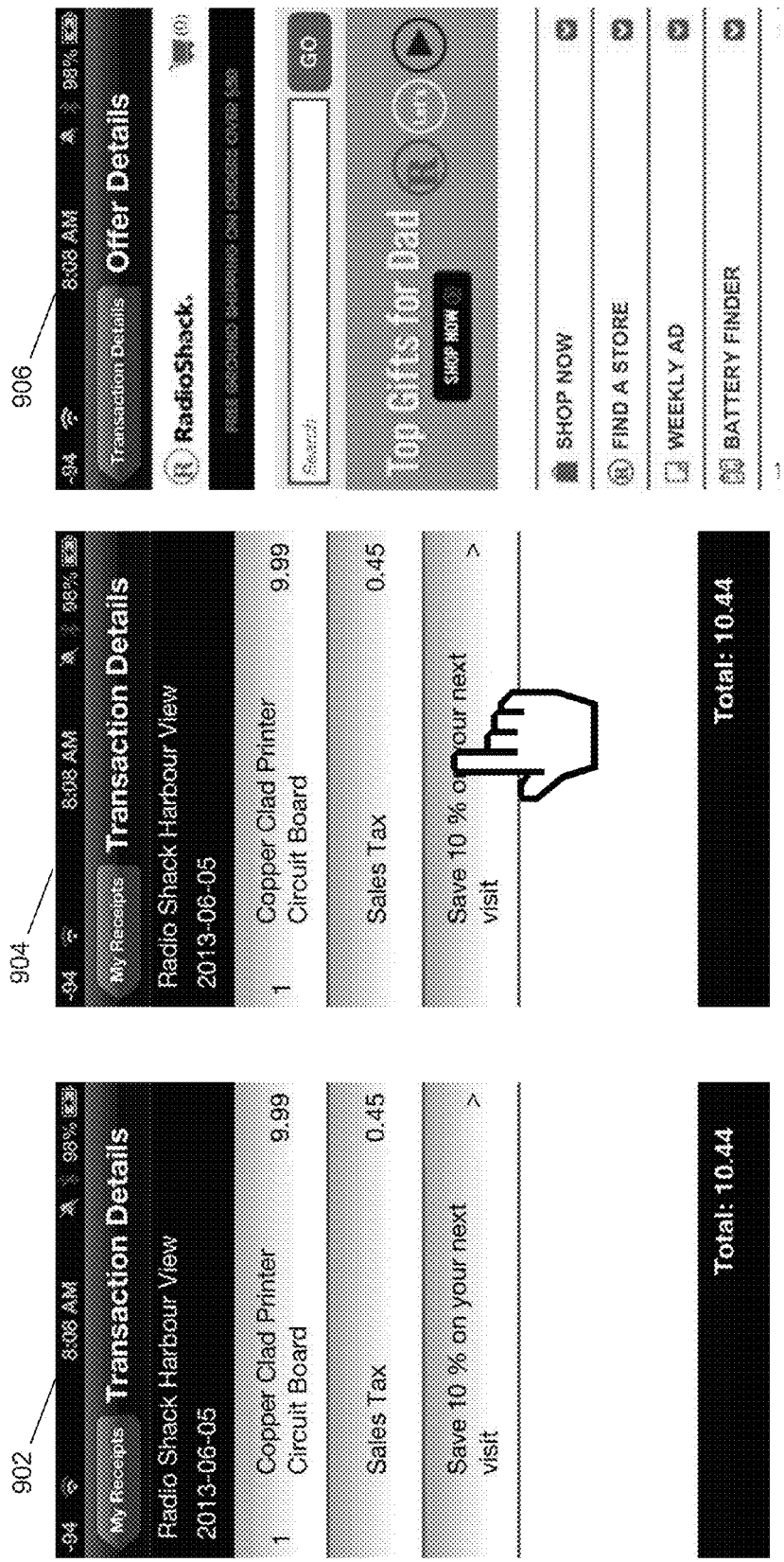
Figure 10:

FIG. 6 illustrates an embodiment of your process performed in a mobile device. The process may generally start at 610 when the mobile device receives, from a point of sale device, identification information, and transaction information corresponding to a user purchase. As an example, this information is encoded in a QR code that is interpreted by the accounting application.

In step 620, the mobile device receives user input identifying the transaction record relating to the purchase. As an example, the accounting application may display a plurality of icons with each icon representing a separate transaction. The user selection of one of the icons is user input identifying the transaction record. In step 630, the mobile device transmits a request for the transaction record to a transaction server. The transaction record selected by the user is associated with an identifier included in the request, where the transaction server uses the identifier to retrieve the corresponding record stored at the server. In step 640, the mobile device receives the transaction record from the transaction server. In step 650, the mobile device displays information related to the transaction record on the screen of the mobile device.

FIGS. 7 through 10 illustrate embodiments of screenshots of the accounting application. As an example, screenshot 702 may be displayed when the user opens up the accounting application on the user's mobile device and presses a scan button. Screenshot 704 illustrates a user pointing a mobile device at a point of sale system's external display screen and lining up a QR code such that the QR code is displayed on the user's mobile device. Screenshot 706 illustrates a transaction summary displayed on the mobile device. This screenshot may be displayed upon the accounting application translating the QR code.

Screenshot 802 illustrates a user using any input mechanism of the user's mobile device (i.e., touch screen) to click on a displayed transaction summary. In some embodiments, the accounting application may display advertisements to users. Screenshot 804 illustrates an advertisement displayed on the user's mobile device if a user is using a free version of the mobile application. In some embodiments, premium version users (i.e., users that pay a fee for purchasing the mobile application) do not receive the advertisement screen displayed in screen 804. Screenshot 806 illustrates the transaction details associated with the transaction summary that was selected in screenshot 802. The transaction details may be retrieved from a remote server (i.e., transaction server) prior to the display of the transaction details in screenshot 806.

According to some embodiments, the account application displays offers and/or rewards. For example, as illustrated in screenshot 806, the displayed transaction details include offers such as a discount on the next visit. Offers may be downloaded from the Cloud web service based on the products or merchants of the transaction. Merchants can target their own stores or products, or advertisers can purchase the advertisement opportunities. As an example, a third-party retailer may pay a fee for inserting their own advertisements into the transaction details that are displayed to the users. In screenshot 904, the user clicks on the offer. In screenshot 906, the user is redirected to an offer page where the offer can be redeemed.

In screenshot 1002, the user can select the "share" button, and then select to send the receipt to a local printer or to a drop box. In some environments, if shared in the drop box, the transaction details will be saved as an Excel® spreadsheet or .csv file depending on the user's settings.

Figure 11:
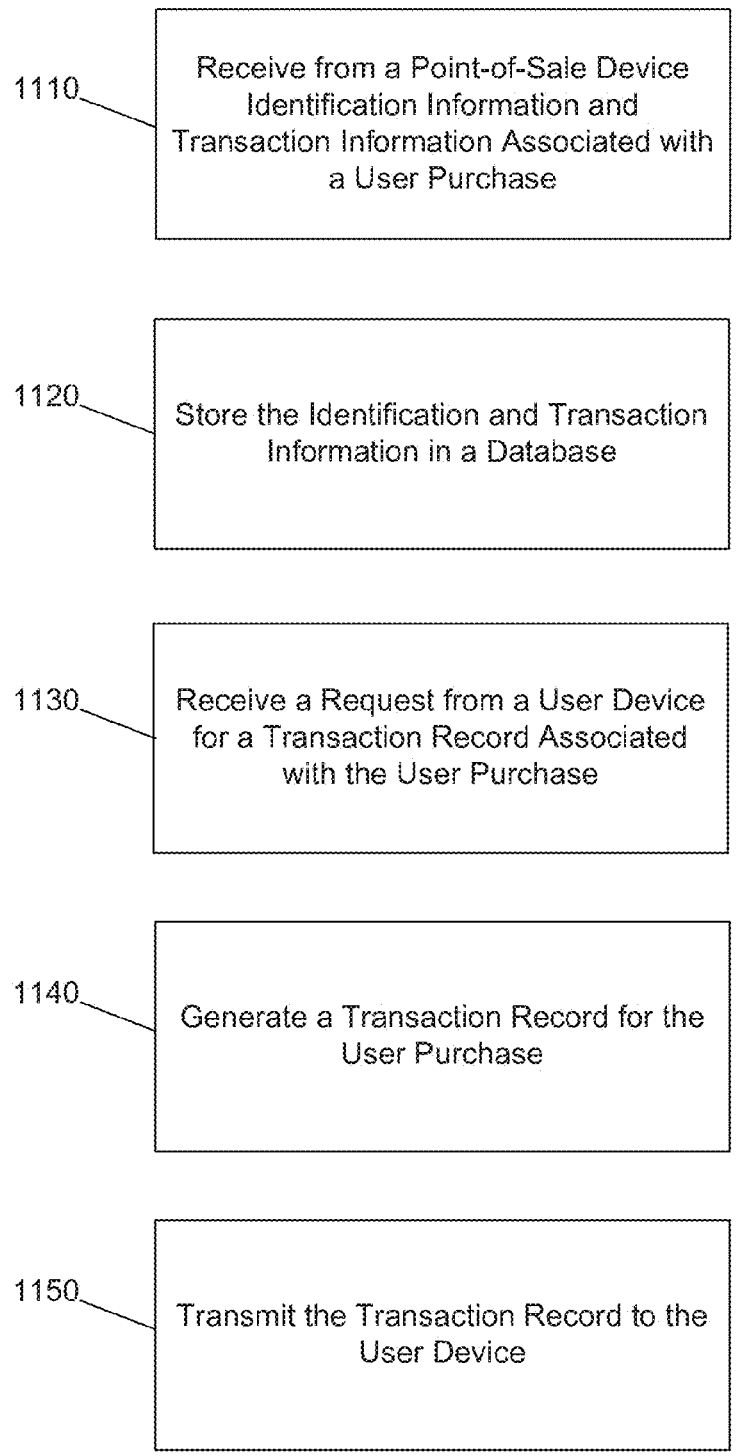
FIG. 11 illustrates an exemplary process performed on a server.

FIG. 11 illustrates an embodiment of a process 1100 that is implemented on a transaction server. The process may generally start at 1110 where the transaction server receives, from a point of sale device, identification information and transaction information associated with the user purchase. In step 1120, the transaction server stores the identification and transaction information in a database. In step 1130, the transaction server receives a request from a user device (i.e., user's smartphone) for a transaction record associated with the user purchase. In step 1140, the transaction server generates a transaction record for the user purchase. In step 1150, the transaction server transmits the transaction record to the user device for display on the user's device as illustrated, for example, in screen shot 806.

Figure 12:
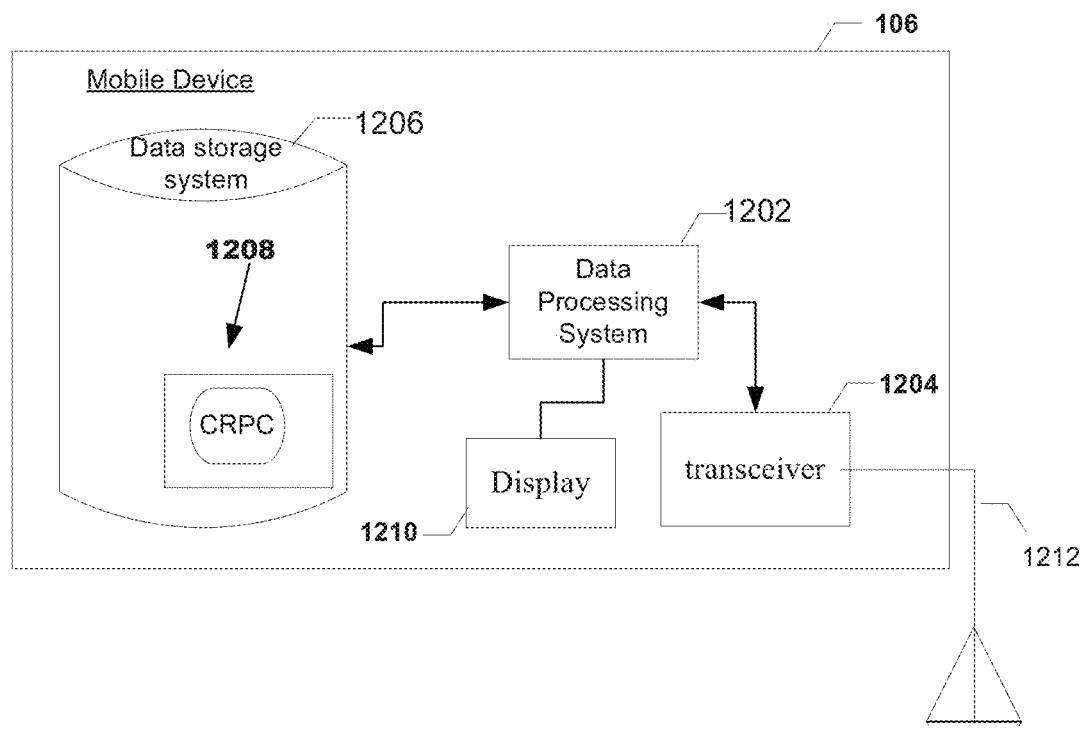
FIG. 12 illustrates an exemplary mobile device.

FIG. 12 illustrates a block diagram of an exemplary wireless device, such as device 106 shown in FIG. 1. As shown in FIG. 12, the device 106 may include: a data processing system 1202, which may include one or more microprocessors and/or one or more circuits, such as an application specific integrated circuit (ASIC), field-programmable gate arrays (FPGAs), and the like, a transceiver 1204 connected to an antenna 1212, a data storage system 1206, which may include one or more non-volatile storage devices and/or one or more volatile storage devices (e.g., random access memory (RAM)), and a display 1210, which may display data such as transaction information and QR codes. According to some embodiments, the data processing system 1202 may comprise a control unit used for selection of transmission parameters.

In embodiments, where data processing system 1202 includes a microprocessor, computer readable program code (CRPC) 1208 may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 1202 to perform steps described above (e.g., steps described above with reference to the flow charts shown in FIG. 6). In other embodiments, the device 106 is configured to perform steps described herein without the need for code. That is, for example, data processing system 1202 may consist merely of one or more ASICs. Hence, the features of the embodiments described herein may be implemented in hardware and/or software.

Figure 13:
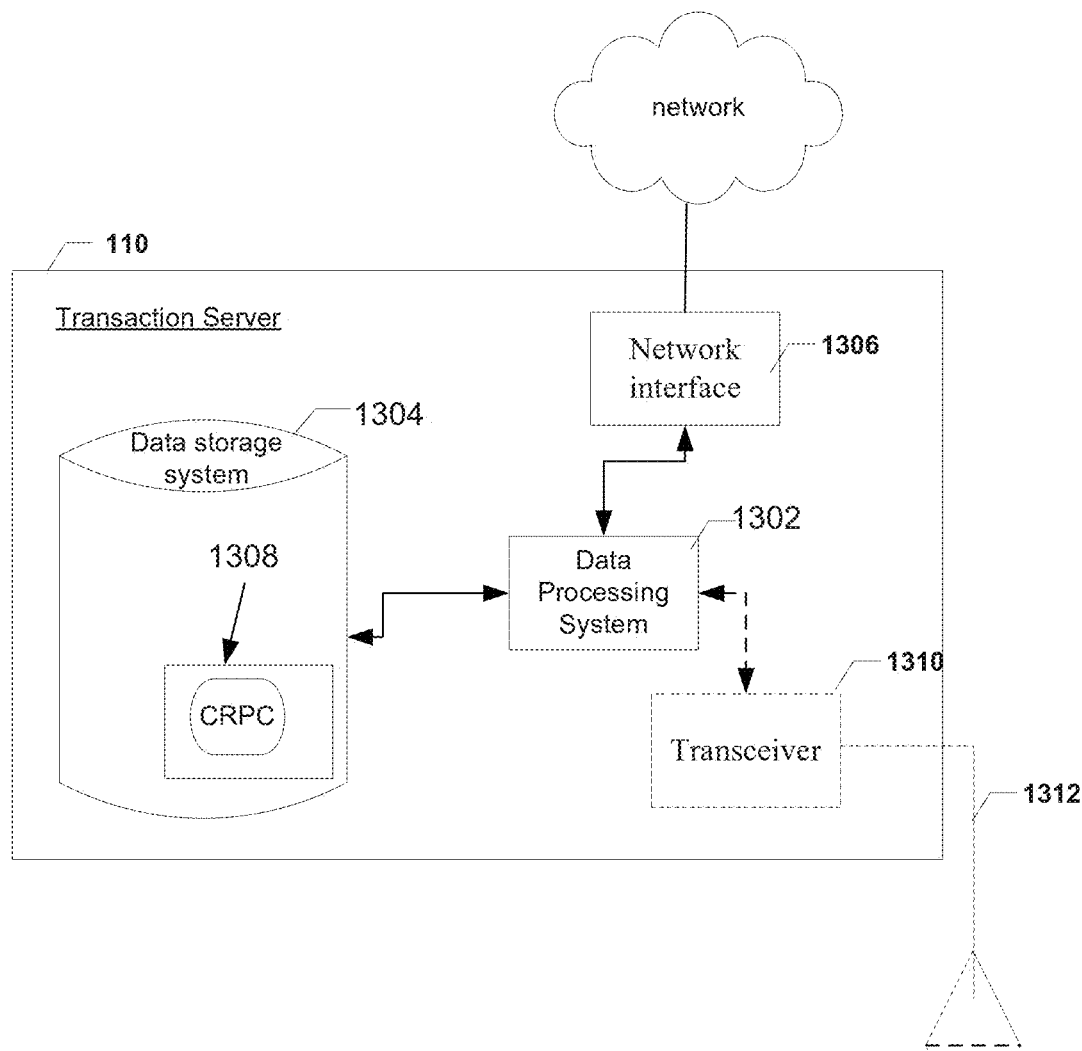
FIG. 13 illustrates an exemplary transaction server.

FIG. 13 illustrates a block diagram of an exemplary transaction server, such as transaction server 110 shown in FIG. 1. As shown in FIG. 13, the transaction server 110 may include: a data processing system 1302, which may include one or more microprocessors and/or one or more circuits, such as an application specific integrated circuit (ASIC), field-programmable gate arrays (FPGAs), and the like; a network interface 1306, and a data storage system 1304, which may include one or more non-volatile storage devices and/or one or more volatile storage devices (e.g., random access memory (RAM)). According to some embodiments, the data processing system 1302 may comprise a control unit used for selection of transmission parameters. The transaction server may also include a transceiver 1310 connected to antenna 1312 for wireless transmission and reception of data.

In embodiments where data processing system 1302 includes a microprocessor, computer readable program code (CRPC) 1308 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1302 to perform steps described above (e.g., steps described above with reference to the flow charts shown in FIG. 11). In other embodiments, the transaction server 110 is configured to perform steps described herein without the need for code. That is, for example, data processing system 1302 may consist merely of one or more ASICs. Hence, the features of the embodiments described herein may be implemented in hardware and/or software.

Figure 14:
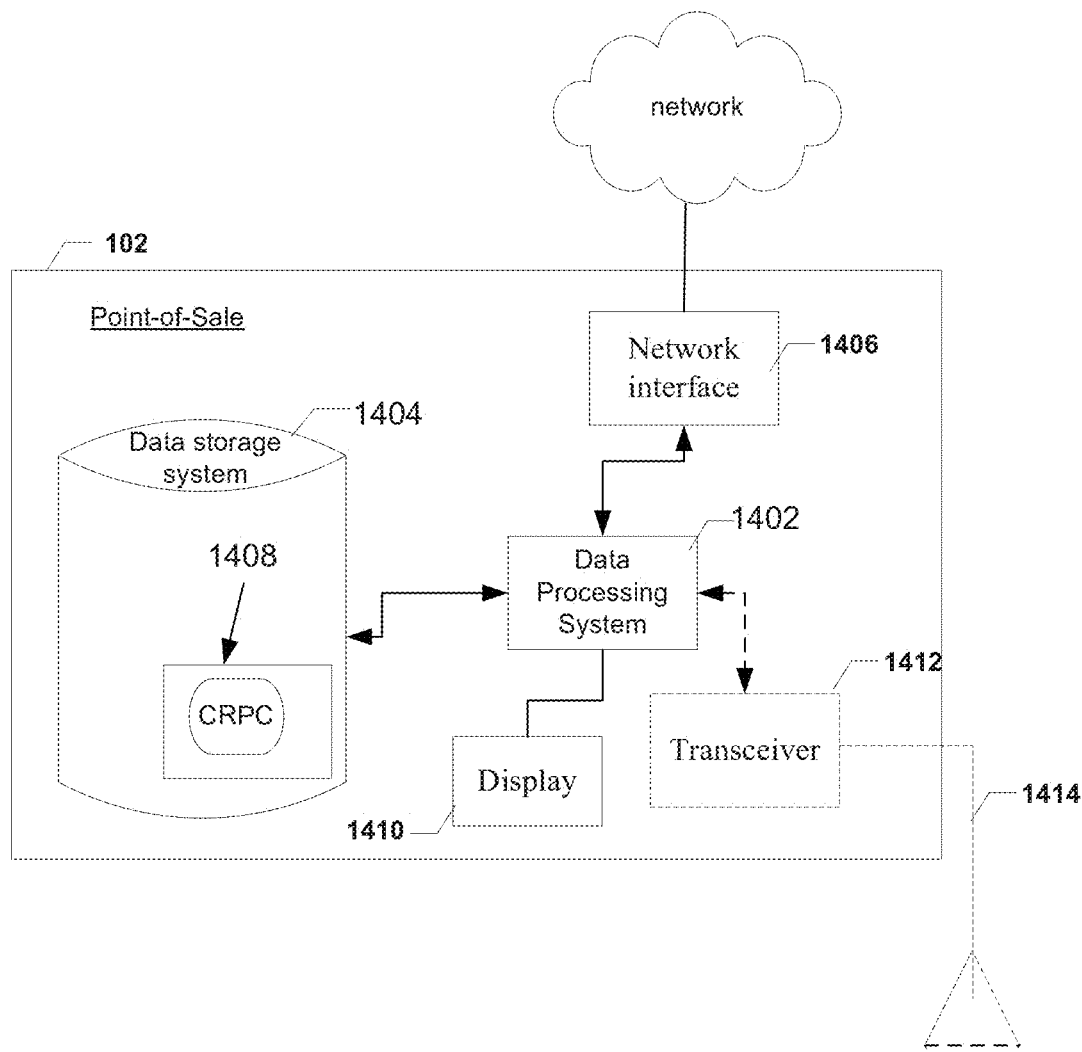
FIG. 14 illustrates an exemplary point of sale device.

FIG. 14 illustrates a block diagram of an exemplary point of sales system such as, such as point of sales system 102 shown in FIG. 1. As shown in FIG. 14, the point of sales system 102 may include: a data processing system 1402, which may include one or more microprocessors and/or one or more circuits, such as an application specific integrated circuit (ASIC), field-programmable gate arrays (FPGAs), and the like; a network interface 1406, a data storage system 1404, which may include one or more non-volatile storage devices and/or one or more volatile storage devices (e.g., random access memory (RAM)), and a display 1410, which may display data such as transaction information and QR codes. According to some embodiments, the data processing system 1402 may comprise a control unit used for selection of transmission parameters. The point of sales system may also include a transceiver 1412 connected to antenna 1414 for wireless transmission and reception of data.

In embodiments where data processing system 1402 includes a microprocessor, computer readable program code (CRPC) 1408 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1402 to perform steps described above (e.g., steps described above with reference to the flow charts shown in FIG. 3). In other embodiments, the point of sales system 102 is configured to perform steps described herein without the need for code. That is, for example, data processing system 1402 may consist merely of one or more ASICs. Hence, the features of the embodiments described herein may be implemented in hardware and/or software.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A system for managing transaction information, the system comprising:
   a user device;
   a transaction server having a processor and a memory; and
   a point-of-sale device, wherein said point-of-sale device is configured to:
      (i) generate a Quick Response (QR) code based on identification information and transaction information associated with a user purchase,
      (ii) communicate said identification information and transaction information to said user device by displaying said QR code on a transaction display, and
      (iii) transmit said identification information and transaction information over a network to said transaction server,
   wherein the user device is configured to capture and decode the QR code to obtain the identification information and retrieve the transaction information from the transaction server using the identification information and display, in a graphical user interface (GUI) of the user device, a transaction summary using the retrieved transaction information,
   wherein, upon selection of the transaction summary, the user device displays in the GUI a transaction detail screen using the retrieved transaction information, the transaction detail screen including at least one line item from the transaction information that is displayed in an area of the GUI that is associated with a hyperlink, the at least one line item not displayed in the transaction summary,
   wherein upon receiving user input at any portion of the area associated with the hyperlink in which the at least one line item is displayed, the user device retrieves from a remote server and displays additional information not displayed in the transaction detail screen, and
   wherein the hyperlink points to the remote server.

2. The system of claim 1, wherein said transaction information includes a transaction date and a transaction amount.

3. The system of claim 1, wherein said point-of-sale device is configured to:
   transmit said identification information and transaction information via a cloud-based web service.

4. The system of claim 1, wherein said user device is configured to:
   receive a user input identifying the transaction summary;
   transmit a request to said transaction server for a transaction record associated with said transaction summary; and
   receive, from said transaction server, said transaction record,
   wherein said transaction record includes at least one of said identification information and transaction information, and
   wherein said transaction detail screen is displayed using said transaction record.

5. The system of claim 1, wherein said user device is further configured to:
   display advertising information, wherein said advertising information is retrieved from a cloud-based web service in based at least in part on one or more of said identification information and transaction information.

6. The system of claim 1, wherein said transaction server is configured to:
   receive an information request from said user device, wherein said information request includes a transaction identifier that identifies the transaction summary;
   based on said transaction identifier, select a transaction record; and
   transmit, to said user device, said transaction record,
   wherein said transaction detail screen is displayed using said transaction record.

7. The system of claim 6, wherein said transaction server is further configured to:
   select advertisement information based at least in part on one or more of said information request, identification information, and transaction information; and
   transmit said advertisement information to said user device.

8. A method for providing transaction information to a user device, comprising:
   obtaining, at a point-of-sale device, identification information and transaction information;

generating, at the point-of-sale device, a Quick Response (QR) code based on said identification information and transaction information;

displaying, at the point-of-sale device, said QR code; and transmitting, from said point-of-sale device to a remote transaction server, said identification information and transaction information, wherein the user device is configured to capture and decode the QR code to obtain the identification information and retrieve the transaction information from the transaction server using the identification information and display, in a graphical user interface (GUI) of the user device, a transaction summary using the retrieved transaction information, wherein, upon selection of the transaction summary, the user device displays in the GUI a transaction detail screen using the transaction, the transaction detail screen including at least one line item from the transaction information that is displayed in an area of the GUI that is associated with a hyperlink, the at least one item not displayed in the transaction summary, wherein upon receiving user input at any portion of the area associated with the hyperlink in which the at least one line item is displayed, the user device retrieves from a remote server and displays additional information not displayed in the transaction detail screen, and wherein the hyperlink points to the remote server.

9. The method of claim 8, wherein said QR code encodes user identification information, a merchant identifier associated with said point-of-sale device, a transaction date, and a transaction amount.

10. A method for obtaining transaction records, comprising:

scanning, at a user device, a Quick Response (QR) code displayed at a point-of-sale device, the QR code generated based on identification information and transaction information corresponding to a user purchase;

displaying, at the user device, a transaction summary using the scanned QR code;

receiving, at the user device, user input identifying the transaction summary;

transmitting, from the user device to a transaction server in response to receiving said user input, a request for a transaction record associated with the transaction summary;

receiving, from the transaction server, a transaction record; and displaying, on a screen of the user device including a graphical user interface (GUI), a transaction detail screen using the received transaction record, the transaction detail screen including at least one line item from the transaction information that is displayed in an area of the GUI that is associated with a hyperlink, the at least one line item not displayed in the transaction summary, wherein upon receiving user input at any portion of the area associated with the hyperlink in which the at least one line item is displayed, the user device retrieves from a remote server and displays additional information not displayed in the transaction detail screen, and wherein the hyperlink points to the remote server.

11. The method of claim 10, wherein said transaction record includes at least one of a merchant identifier, a transaction amount, a transaction date, and an item description.

12. The method of claim 10, further comprising:

displaying, on the screen of the user device, advertisement information, wherein said advertisement information is related to said user purchase.

13. The method of claim 12, further comprising:

transmitting, from the user device to the transaction server, a request for said advertisement information based on at least one of said transaction record, identification information and transaction information; and receiving, at the user device from the transaction server, said advertisement information.

14. The method of claim 10, further comprising:

displaying, on the screen of the user device, a prompt to perform one or more of displaying said transaction record, printing said transaction record, exporting said transaction record, storage of said transaction record to a remote database, and synching of said transaction record with a remote accounting program;

receiving, at the user device, user input responsive to said prompt, and;

performing a transaction record management task based on said user input responsive to said prompt.

15. A method for managing transaction records, comprising receiving, at a transaction server from a point-of-sale device, identification information and transaction information associated with a user purchase;

storing, in a database, said identification information and transaction information;

receiving, from a user device, a request of a transaction record associated with a transaction summary displayed on a user device, the transaction summary displayed using a Quick Response (QR) code displayed on the point-of-sale device, the QR code generated based on the identification information and the transaction information;

generating, at the transaction server, a transaction record associated with said user purchase; and transmitting, from said transaction server to the user device, said transaction record, wherein the user device displays, in a graphical user interface, a transaction detail screen using the received transaction record, the transaction detail screen including at least one item from the transaction information that is displayed in an area of the GUI that is associated with a hyperlink, the at least one line item not displayed in the transaction summary, wherein upon receiving user input at any portion of the area associated with the hyperlink in which the at least one line item is displayed, the user device retrieves from a remote server and displays additional information not displayed in the transaction detail screen, and wherein the hyperlink points to the remote server.

16. The method of claim 15, further comprising:

selecting, at the transaction server, advertisement information based on at least one of said transaction record, identification information, and transaction information; and transmitting, from the transaction server to the user device, said advertisement information.

17. The method of claim 15, further comprising:

receiving, at the transaction server from the user device, a request to perform a transaction record management task; and performing said transaction record management task, wherein said transaction management task comprises at least one of printing said transaction record, exporting said transaction record, storage of said transaction record to a remote database, and synching of said transaction record with a remote accounting program.

18. The system of claim 1, wherein upon selection of the hyperlink, the user device displays advertising information and/or product information in response to determining that the user device is operating a free version of the mobile application.

19. The system of claim 1, wherein the at least one line item displayed in the area associated with the hyperlink includes a list of a purchased good and an amount of the purchased good.

20. The system of claim 1, wherein the remote server is a cloud web service.

21. The system of claim 1, wherein the remote server is the transaction server.

22. The system of claim 1, wherein the additional information includes an advertisement.

* * * * *